United States Patent [19]

Iwao

[11] Patent Number: 4,980,597
[45] Date of Patent: Dec. 25, 1990

[54] ULTRASONIC MOTOR WITH VIBRATION SUPPRESSOR

[75] Inventor: Naoto Iwao, Nagoya, Japan

[73] Assignee: Brother Kogyo Kabushiki Kaisha, Aichi, Japan

[21] Appl. No.: 513,962

[22] Filed: Apr. 24, 1990

[30] Foreign Application Priority Data

Jun. 27, 1989 [JP] Japan .................................. 1-164140

[51] Int. Cl.$^5$ ............................................. H01L 41/08
[52] U.S. Cl. ..................................... 310/319; 310/323; 310/326; 310/316
[58] Field of Search ............... 310/323, 326, 316, 317, 310/319; 318/116, 118

[56] References Cited

U.S. PATENT DOCUMENTS

| | | | |
|---|---|---|---|
| 4,122,725 | 10/1978 | Thompson | 310/326 X |
| 4,158,787 | 6/1979 | Forward | 310/326 X |
| 4,513,219 | 4/1985 | Katsuma et al. | 310/316 X |

FOREIGN PATENT DOCUMENTS 0075909 4/1988 Japan ..................................... 310/317

Primary Examiner—Mark O. Budd
Attorney, Agent, or Firm—Oliff & Berridge

[57] ABSTRACT

An ultrasonic motor includes a retaining member which retains an ultrasonic vibrator. An electromechanical transducing element such as a piezoelectric element is attached on the retaining member. An impedance element is electrically connected with the electromechanical transducing element to form a closed circuit, and the antiresonance frequency of a parallel circuit formed of the reactance component of the electromechanical transducing element and the impedance element is substantially the same as the frequency of the ultrasonic vibration of the ultrasonic vibrator. This structure suppresses undesirable vibration in the retaining member and thus also avoids the undesirable propagation of vibration to external equipment.

10 Claims, 1 Drawing Sheet

ULTRASONIC MOTOR WITH VIBRATION SUPPRESSOR

BACKGROUND OF THE INVENTION

1. Field of the Invention

The present invention relates to an ultrasonic motor using ultrasonic vibration generated by its ultrasonic vibrator for driving energy.

2. Description of the Prior Art

In conventional ultrasonic motors, there were devised various means for effectively converting the driving energy from the ultrasonic vibrator into kinetic energy for the movable member. For example, a retaining member for retaining the ultrasonic vibrator is installed at a position in agreement with the node of the ultrasonic vibration so that the retaining member is kept from generating vibration and the driving energy is prevented from dissipating to the outside through the housing.

In such an arrangement as described above, however, there is a problem that a vibration is generated in the retaining member when a load is connected to the motor or when the load is varied, and thereby, the driving energy is dissipated to the outside. The reason a vibration is generated in the retaining member when a load is connected to the motor is that, when the ultrasonic vibrator is pressed against the movable member and load is connected to the motor, then, even if the retaining member has been set up at a nominal position in agreement with the node of the vibration in the initial stage where no load was connected to the motor, deformation or other changes occur in the component parts by action of the press exerted on the movable member or variations in the load, and, due to uncertain factors such as the deformation, the position of the node of the vibration is moved from the position where the retaining member is installed. When a vibration is thus generated in the retaining member, such problems arise that output efficiency of the motor is lowered due to the fact that the operation of the motor becomes unstable or the driving energy is consumed by the vibration of the retaining member, or undesirable effects might occur due to the fact that the vibration is propagated through the housing to external equipment.

SUMMARY OF THE INVENTION

Accordingly, it is an object of the present invention to provide an ultrasonic motor in which a retaining member for retaining the ultrasonic vibrator is kept from generating vibration and thereby the output efficiency is increased.

According to the present invention, there is provided an ultrasonic motor comprising: an ultrasonic vibrator for generating an ultrasonic vibration; retaining means for retaining said ultrasonic vibrator; a movable member pressed against said ultrasonic vibrator; electromechanical transducing means attached to said retaining means for converting energy from mechanical vibration into electrical vibration and vice verse; and an impedance element connected with said electromechanical transducing means and forming a closed circuit, wherein a frequency of an antiresonance signal of the closed circuit is substantially the same as the frequency of the ultrasonic vibration of said ultrasonic vibrator.

In the ultrasonic motor with the described arrangement, when the ultrasonic vibration generated by the ultrasonic vibrator acts on the retaining member for retaining the ultrasonic vibrator, thereby causing the retaining member to start vibrating, then, the closed circuit formed of the electromechanical transducing element attached to the retaining and the impedance element connected with the electromechanical transducing element behave as described below.

With the start of the vibration of the retaining member, the electromechanical transducing element starts to deform, thereby generating an electric output signal (antiresonance signal) at the same frequency as that of the vibration of the retaining member, i.e., at the same frequency as that of the ultrasonic vibration. At this time, since the frequency of the closed circuit formed of the electromechanical transducing element and the impedance element virtually coincides with the frequency of the vibration of the retaining member, no current flows out of the output terminal of the electromechanical transducing element. Since the deformation of the electromechanical transducing element is essentially proportional to the magnitude of the current flowing out of its output terminal, the electromechanical transducing element is inhibited from deforming, so that mechanical vibration of the retaining member is suppressed.

BRIEF DESCRIPTION OF THE DRAWINGS

The above and other objects, features, and advantages of the present invention will become more apparent from reading the following description of the preferred embodiment taken in connection with the accompanying drawings, in which.

DETAILED DESCRIPTION OF THE PREFERRED EMBODIMENT

Figure 1:
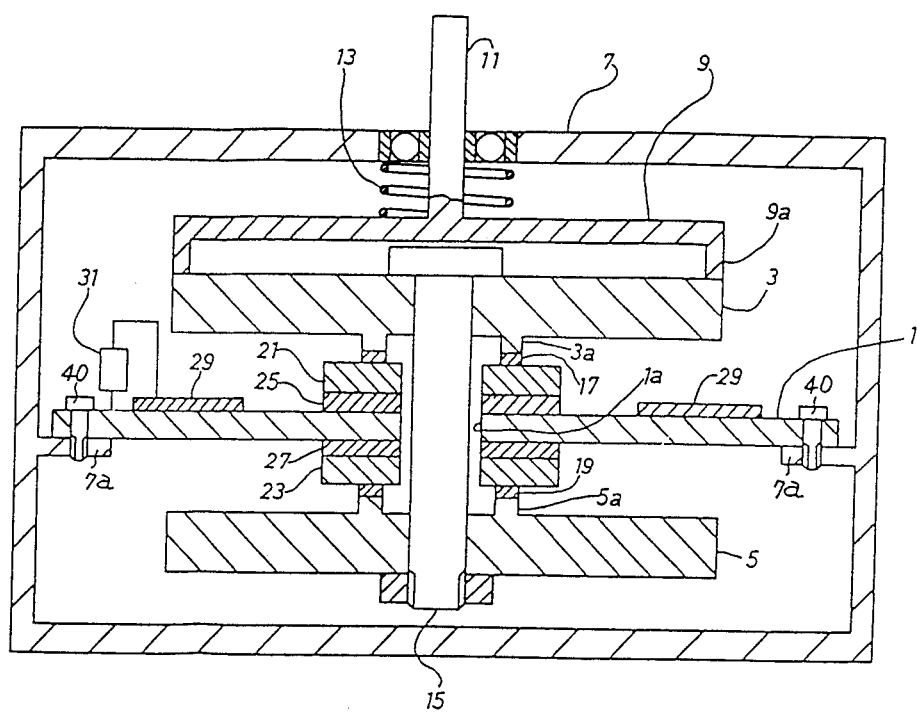
FIG. 1 is a sectional view of an ultrasonic motor as an embodiment of the present invention.

The ultrasonic motor shown in FIG. 1 is a standing wave type rotary motor, in which disk type elastic members 3 and 5 are disposed on both sides of a retaining member 1, symmetrically about it. The retaining member 1 is made of an electrically conductive material. One disk type elastic member 3 of the two disk type elastic members 3 and 5 is adapted to receive a press from a movable member 9 supported by a housing 7 for rotation. The movable member 9 has an output shaft 11 formed integrally therewith. Between the housing 7 and the movable member 9, there is interposed a compression spring 13, whereby a press of the movable member 9 exerting on the disk type elastic member 3 is provided.

The disk type elastic members 3 and 5 have symmetrical disk forms of the same structures. These disk type elastic members 3 and 5 are coupled together by a bolt 15 with the retaining member 1 interposed therebetween.

Structure of each of the disk type elastic members 3 and 5 will be described below. On the surface of each of the disk type elastic members 3 and 5 toward the retaining member 1, there is provided an annular protrusion 3a, 5a, and to the end thereof is attached a piezoelectric element 17, 19. To the sides of the piezoelectric elements 17 and 19 toward the retaining member 1 are attached other piezoelectric elements 25 and 27 with insulating spacers 21 and 23 interposed therebetween. These piezoelectric elements 17, 19, 25, and 27 are all in an annular form and are arranged such that their axial centers are in alignment with the axis of a through hole 1a made in the retaining member 1.

Of the piezoelectric elements 17, 19, 25, and 27, the piezoelectric elements 17 and 19 attached to the annular protrusions 3a and 5a of the disk type elastic members 3 and 5 are for energizing shearing vibrations in the circular direction in the disk type elastic members 3 and 5. On the other hand, the piezoelectric elements 25 and 27 attached to the sides of the piezoelectric elements 17 and 19 toward the retaining member 1 with spacers 21 and 23 interposed therebetween are for energizing bending vibrations in the disk type elastic members 3 and 5 in the axial direction. These piezoelectric elements 17, 19, 25, and 27 are connected with a common A.C. high voltage generator circuit, which is not shown.

The movable member 9 is pressed against the disk type elastic member 3 and is provided with a contacting portion 9a on the entire circumference of its face on the side toward the disk type elastic member 3.

The retaining member 1 has a disk form with the through hole 1a made in the center thereof. The retaining member 1 is fixed at its circumferential portion to mounting portion 7a of the housing 7 by means of screws 40 and it is disposed approximately in the center of the height of the interior of the housing 7. To the top face of the retaining member 1 is attached an annular piezoelectric element 29. The piezoelectric element 29 is connected with an impedance element such as a variable coil 31 whereby a closed circuit is formed. The frequency of the closed circuit formed of the piezoelectric element 29 and the variable coil 31 is set to be in agreement with the frequency of the ultrasonic vibration generated by the ultrasonic vibrator.

The piezoelectric element 29 is formed of lead zirconate titanate (PZT) or the like and has electrodes formed on both its faces. The electrode on the side of the top face (open face) is directly connected with the variable coil 31 and the electrode on the side of the bottom face (joint face) is electrically connected with the retaining member 1, whereby its conduction with the variable coil 31 is achieved through the conductive retaining member 1. The retaining member 1 can be made of a nonconductive material, in which case the electrode on the side of the bottom face may also be directly connected with the variable coil 31.

The variable coil 31 is a coil provided with a mechanism for regulating its inductance such as by moving its internal core in and out.

Figure 2:
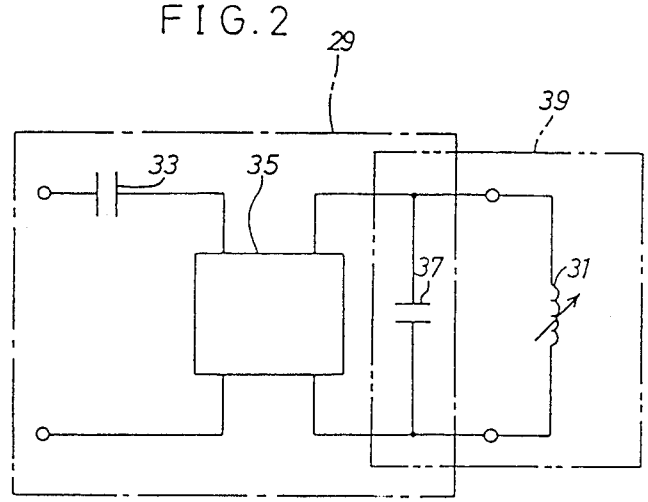
FIG. 2 is a circuit diagram showing an electrical equivalent circuit to a closed circuit of the invention.

FIG. 2 is a circuit diagram showing an electrical/mechanical equivalent circuit to the closed circuit. The piezoelectric element 29 is represented by a mechanical compliance 33, a force factor 35, and a capacitance 37. The terminals at the left hand side depict mechanical energy such as mechanical vibration applied to or produced by the piezoelectric element 29. The terminals at the right hand side depict terminals for the output or input of electrical energy by the piezoelectric element 29. The frequency fa of an antiresonance signal of the closed circuit 39 formed of the capacitance 37 and the variable coil 31 is given by $$fa = \frac{1}{2\pi \sqrt{LC}} \ [Hz]$$

where L is inductance of the variable coil 31 and C is the capacitance 37 of the piezoelectric element 29.

In the ultrasonic motor of the embodiment arranged as described above, ultrasonic vibrations at a predetermined frequency are energized in the disk type elastic members 3 and 5 by action of the piezoelectric elements 17, 19, 25, and 27, whereby elliptical motion is generated in each mass point on the entire circumference of the disk type elastic members 3 and 5. Each of the mass points of the disk type elastic member 3 repeats such motion as to come into contact with a contacting portion 9a of the movable member 9 for a very short period of time thereby moving the movable member 9 a microscopic distance through friction between the surfaces in contact. Thus, the movable member 9 is caused to continuously rotate thereby rotating the output shaft 11. Since the piezoelectric elements 17, 19, 25, and 27 are connected with a common A.C. high voltage generator circuit so that the disk type elastic members 3 and 5 make symmetrical vibrations about the retaining member 1 interposed therebetween, the nominal position of the retaining member 1 is in agreement with the position of the node of the ultrasonic vibration.

However, exertion of the press of spring 13 on the movable member 9 or variation in the load applied to the output shaft 11 leads to the occurrence of deformation or the like in the component parts, and uncertain factors such as the deformation cause the position of the node of the vibration to shift and, hence, the retaining member 1 is subject to vibration. At the start of this vibration, however, the vibration of the retaining member 1 is suppressed with the structure of the present embodiment, so that the vibration is not generated. This is because, when the piezoelectric element 29 receives the vibration of the retaining member 1 and just starts to generate an output voltage with the same frequency as that of the vibration of the retaining member 1, the parallel circuit 39 (FIG. 2 equivalent circuit) formed of the capacitance 37 of the piezoelectric element 29 and the variable coil 31 behaves as described below.

That is, the frequency of the parallel circuit 39 is in agreement with the frequency of the ultrasonic vibration and, hence, the current flowing through the capacitance 37 becomes a large current, which leads the change in the voltage output of the force factor 35 by a phase angle of the 90 degrees, while the current flowing through the variable coil 31 becomes a large current lagging on the change in the voltage output of the force factor 35 by a phase angle of 90 degrees. Since only exchanging of energy takes place between these two elements, no current flows through the force factor 35. Under such conditions, since no current passes through the force factor 35 even though a voltage output accompanying the vibration of the retaining member 1 is generated thereby, it cannot convert the vibration amplitude into a current output. Therefore, the piezoelectric element 29 is inhibited from deforming and, hence, the vibration of the retaining member 1 with the piezoelectric element 29 attached thereto is suppressed. In this sense, the signal of the closed circuit is an antiresonance signal.

According to the ultrasonic motor of the present embodiment as described above, by arranging the frequency of the parallel circuit formed of the piezoelectric element 29 and the variable coil 31 to agree with the frequency of the ultrasonic vibration, even if the position of the node of the vibration is shifted due to uncertain factors including the aforesaid deformation, thereby leading to initiation of vibration of the retaining member 1, the vibration is suppressed, and thus a good effect is obtained; namely, vibration of the retaining member 1 can be prevented.

Therefore, it hardly occurs that operation of the ultrasonic motor becomes unstable or the driving energy is dissipated through vibration of the retaining member 1 as with the conventional ultrasonic motor, and it becomes possible to improve the output efficiency of the ultrasonic motor. In addition, the danger of the vibration of the motor propagating to the outside thereby adversely affecting external equipment can be eliminated. Further, since no power is used in suppressing the vibration by the closed circuit formed of the piezoelectric element 29 and the variable coil 31, the improvement in the output efficiency obtained by the prevention of the vibration of the retaining member 1 is not reduced.

Further, since the ultrasonic vibrator of the present embodiment is such that it is retained by the retaining member 1 installed at the position of the node of the vibration so as to prevent the retaining member 1 from generating vibration, and the motor comprises the closed circuit formed of the piezoelectric element 29 and the variable coil 31 acting to suppress an vibration which does occur in the retaining member, the vibration of the retaining member 1 can be more reliably avoided.

Further, an effect is obtained that the ultrasonic motor of the described type can be provided in a small size since the employment of the piezoelectric element 29 and the variable coil 31 requires only a small space for installation.

While the present invention has been described in the foregoing with reference to a particular embodiment, it will be understood that various changes in form and detail may be made without departing from the spirit and scope of the invention. For example, the present invention may also be applied to motors of a progressive wave type or to motors of a linear type. As the electromechanical transducer, any of devices capable of converting energy from mechanical vibration into electric vibration, such as a electrostrictive element and a magnetostrictive element, may be used. As the impedance element, a structure with a variable capacitor connected in parallel with a coil may be used. The retaining member may be that concurrently serving as the housing.

What is claimed is:

1. An ultrasonic motor comprising:
   an ultrasonic vibrator for generating an ultrasonic vibration;
   retaining means for retaining said ultrasonic vibrator;
   a movable member pressed against said ultrasonic vibrator;
   electromechanical transducing means attached to said retaining means for converting energy from mechanical vibration into electrical vibration and vice verse; and
   means for applying to said electromechanical transducing means an antiresonance signal having a frequency substantially equal to the frequency of the vibration of said ultrasonic vibrator.

2. An ultrasonic motor comprising:
   an ultrasonic vibrator for generating an ultrasonic vibration;
   retaining means for retaining said ultrasonic vibrator;
   a movable member pressed against said ultrasonic vibrator;
   electromechanical transducing means attached to said retaining means for converting energy from mechanical vibration into electrical vibration and vice verse; and
   electrical circuit means including said electromechanical transducing means for producing an antiresonance signal acting to suppress vibration of said retaining means.

3. An ultrasonic motor comprising:
   an ultrasonic vibrator for generating an ultrasonic vibration;
   retaining means for retaining said ultrasonic vibrator;
   a movable member pressed against said ultrasonic vibrator;
   electromechanical transducing means attached to said retaining means for converting energy from mechanical vibration into electrical vibration and vice verse; and
   an impedance element connected with said electromechanical transducing means and forming a closed circuit, wherein a frequency of an antiresonance signal of the closed circuit is substantially the same as the frequency of the ultrasonic vibration of said ultrasonic vibrator.

4. An ultrasonic motor according to claim 3, wherein said retaining means is nominally located at a node of the ultrasonic vibration of said ultrasonic vibrator.

5. An ultrasonic motor according to claim 3, wherein said ultrasonic motor is a rotary motor, and wherein said movable member includes an output shaft.

6. An ultrasonic motor according to claim 5, wherein said electromechanical transducing means has an annular shape whose center is arranged on an axis of said output shaft.

7. An ultrasonic motor according to claim 3, further comprising a housing, and wherein said retaining member is fixed to said housing.

8. An ultrasonic motor according to claim 3, wherein said electromechanical transducing means includes a piezoelectric element.

9. An ultrasonic motor according to claim 3, wherein said impedence element includes a variable inductance element.

10. An ultrasonic motor according to claim 9, wherein said variable inductance element is a variable coil.

* * * * *